Figure 4:
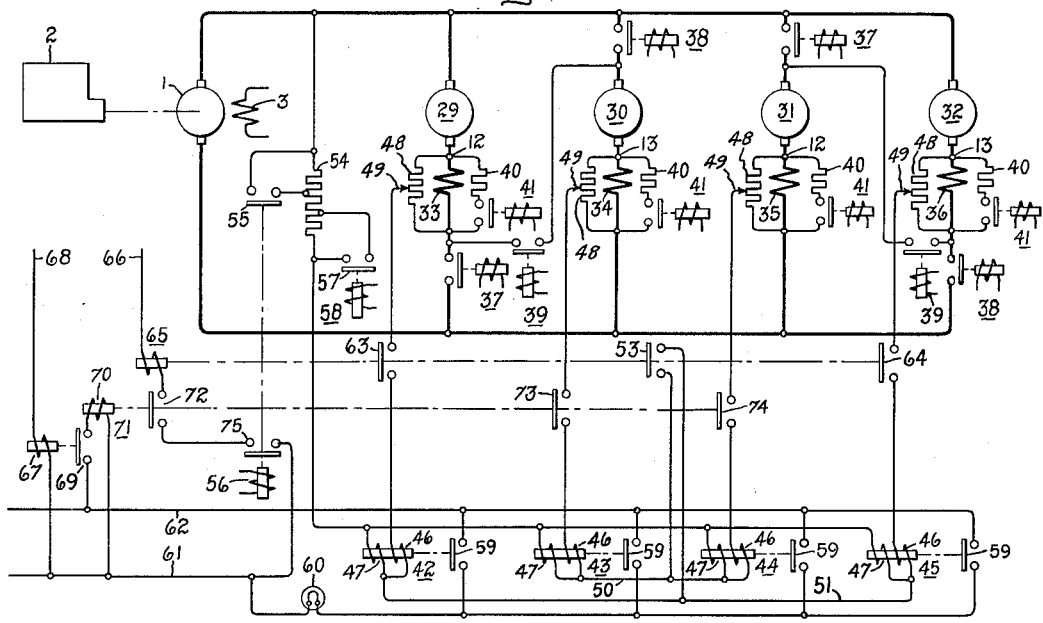

Aug. 23, 1955    V. V. SECAREA ET AL    2,716,209
PLURAL MOTOR DRIVE WITH WHEEL SLIP DETECTION
Filed April 13, 1951    2 Sheets-Sheet 1
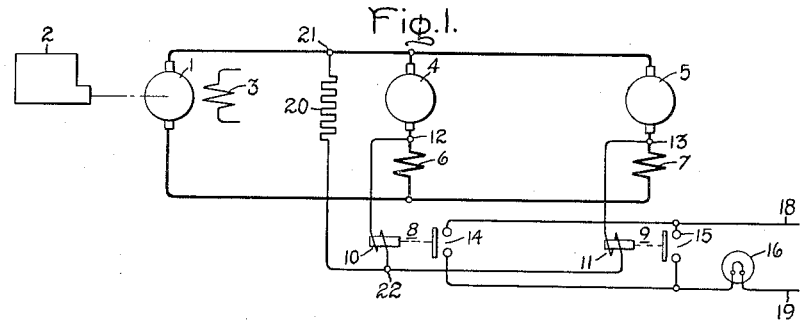
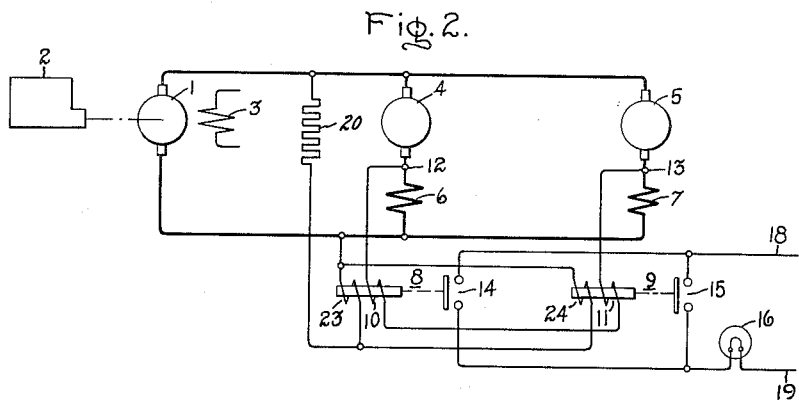
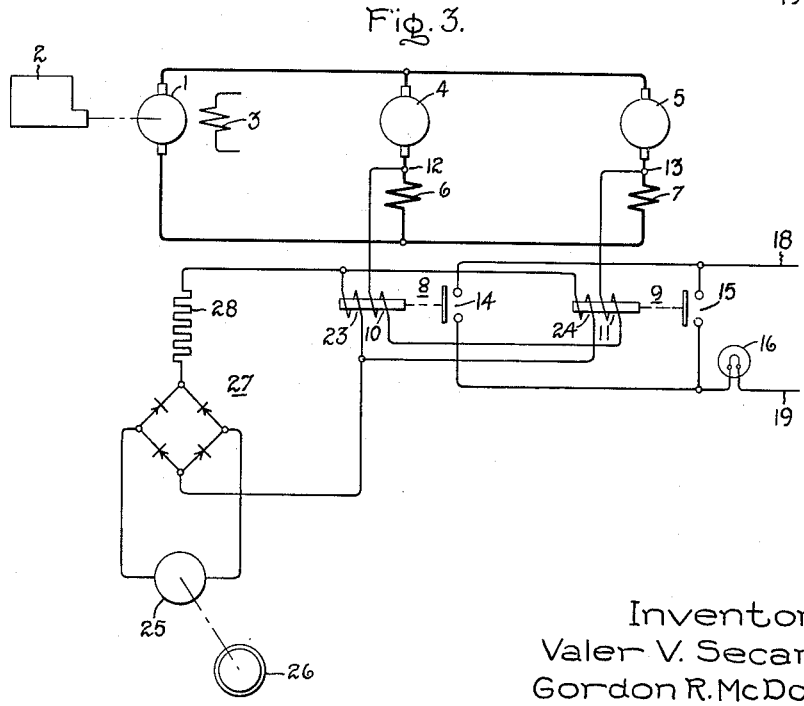
Inventors:
Valer V. Secarea,
Gordon R. McDonald,
by Ernest C. Britton
Their Attorney.

Inventors:
Valer V. Secarea,
Gordon R. McDonald,
by Ernest C. Britton
Their Attorney.

United States Patent Office 2,716,209
Patented Aug. 23, 1955

2,716,209

PLURAL MOTOR DRIVE WITH WHEEL SLIP DETECTION

Valer V. Secarea and Gordon R. McDonald, Erie, Pa., assignors to General Electric Company, a corporation of New York Application April 13, 1951, Serial No. 220,919

14 Claims. (Cl. 318—52)

This invention relates to systems for detecting the wheel slip of self-propelled vehicles and more particularly to a system for detecting wheel slip of a vehicle having a plurality of electric traction motors, for example a diesel-electric locomotive.

In operation of a self-propelled rail vehicle such as a diesel-electric locomotive having a plurality of electric traction motors separately connected to the driving axles, one pair of wheels connected to an axle sometimes slips on the track. This wheel slippage may be caused when rapid acceleration is attempted under heavy load conditions and may also occur when the locomotive is running at high speed due to track condition, track irregularities, vibration, etc. When this slippage occurs, the motor driving the slipping axle accelerates to a higher speed than the other motors and may be damaged due to the high resultant mechanical stresses. Furthermore, when the traction motors are connected for energization in either series or parallel circuit relation, the slipping axle relieves its connected motor of any substantial portion of the load so that the remaining motors connected to the non-slipping axles are subject to higher currents and are in turn liable to cause additional wheels to slip.

It is, therefore, desirable in the design of such vehicles to provide for the detection of wheel slippage during motoring, the detecting device being connected to either reduce the energization of the motor connected to the slipping axle or to merely give an indication to the engineman of the wheel slippage so that he can manually reduce the excitation.

A common method of wheel slip detection is known as the field drop comparison system. Such a system is shown in Patent 2,328,994 to Harold S. Ogden issued September 7, 1943, and assigned to the assignee of the present application. Since traction motors are conventionally of the series type, slippage of the wheels to which the motor is connected will result in a decrease in the armature current of that motor resulting in a corresponding decrease in the voltage drop across the associated series field exciting winding. In the field drop comparison system, the difference in field voltage drop between field of the motor connected to the slipping wheels and the field of a motor connected to wheels which are not slipping is utilized to provide the slippage indication. In accordance with this system, a relay is conventionally provided having a coil connected between equi-potential points in the circuits of two of the traction motors. As long as the wheels connected to either motor are not slipping, the voltage drop across the fields of the motors will be substantially equal and the wheel slip relay will, therefore, not be energized. However, in the event the wheels connected to one of the motors slip, a voltage differential will result thereby energizing the wheel slip relay.

This system is satisfactory at low locomotive speeds where the motor armature current and therefore the field current is relatively high. All relays, however, pick up on a fixed voltage difference and, therefore, the sensitivity of this system decreases as the locomotive speed is increased. Thus, at higher speeds with reduced armature and field current, a greater difference in speed between the slipping axle and the non-slipping axle is necessary in order to cause energization of the relay and thus detection of the slipping condition. It will therefore be seen that at low speeds when the motors are usually connected in series without field shunting, the wheel slip protection afforded is good since a relatively low differential between the slipping axle and the non-slipping axle will cause energization of the relay. The protection provided is decreased appreciably when the fields are shunted in the series connection and as higher speeds are reached where the motors are conventionally connected in parallel, the amount of protection is further decreased. Finally, at highest speeds when the motors are connected in parallel with the fields shunted, substantially no wheel slip protection remains.

The simple field drop comparison system has been accepted in the past, since it has been believed that wheel slip protection was not necessary at low adhesion corresponding to high speed operation. Evidence has accumulated, however, indicating that wheel slippage resulting in damaged motor armatures has occurred during high speed operation. This evidence further shows that the slipping at high speed mainly occurred on the leading axle of the locomotive which encounters the poorest rail conditions and is the one most likely to slip. It is, therefore, desirable to provide a wheel slip detection system which will retain its sensitivity throughout a speed range of the locomotive so that wheel slip protection will be provided at high speeds as well as at low speeds.

It is, therefore, an object of this invention to provide an improved wheel slip detection system wherein protection is afforded over the entire speed range of the locomotive.

Further objects and advantages of this invention will become apparent and the invention will be better understood by reference to the following description and the accompanying drawing, and the features of novelty which characterize this invention will be pointed out with particularity in the claims annexed to and forming a part of this specification.

This invention in its broadest aspects contemplates a wheel slip detection system of the field drop comparison type in which the wheel slip relays are recalibrated in response to the speed of the locomotive to provide protection over the entire speed range. More specifically, this invention provides for continuous change in calibration of the wheel slip relays by utilizing a biasing voltage which changes proportionally to the change in speed of the locomotive. This biasing voltage may be secured from the output of the traction generator or from an axle generator.

Figure 5:
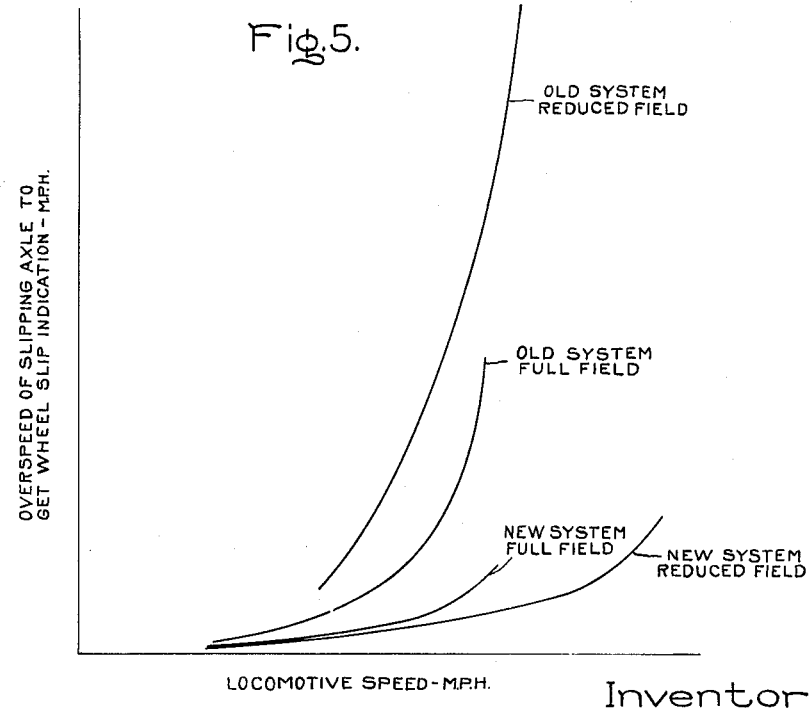

In the drawings, Fig. 1 is a schematic illustration of the improved wheel slip detection circuit of this invention; Fig. 2 illustrates a modified circuit requiring less current for biasing; Fig. 3 illustrates a further modification utilizing an axle generator for the source of biasing voltage; Fig. 4 is a schematic diagram illustrating the application of the improved wheel detection system of this invention to a four axle vehicle in which series and parallel connection of the traction motors is provided; and Fig. 5 shows curves comparing the convention field drop comparison system and the improved system of this invention.

Referring now to Fig. 1, there is shown a traction generator 1 driven by a suitable prime mover 2, for example a diesel engine, and having a suitable shunt field exciting winding 3 arranged for energization from a suitable excitation system (not shown). The traction generator 1 is connected in a loop circuit for motoring with traction motors 4 and 5 which are respectively provided with series field windings 6 and 7. A pair of wheel slip relays 8 and 9 are provided having their coils 10 and 11 respectively arranged in series and connected between equipotential points in the circuits of the traction motors 4 and 5. In Fig 1, the relay coils 10 and 11 are shown as being connected between point 12 between the armature of motor 4 and the series field 6 and similar point 13 between the armature of motor 5 and series field 7. The wheel slip relays 8 and 9 are arranged to actuate contacts 14 and 15 respectively arranged in series with indicating lamp 16. The indicating lamp 16 is arranged for energization from a suitable source of voltage (not shown) through lines 18 and 19.

In a typical diesel-electric locomotive utilizing a motor and generator circuit described above, the traction motors 4 and 5 when starting require high current at low voltage. As the speed of the locomotive increases, the motor armature current decreases and the generator voltage increases. When the maximum generator voltage is reached, the motor connections may be changed in any conventional manner (not shown), as for instance by shunting the motor fields, and the generator characteristic curve is again traversed starting at the high current end. With still further increases in speed, the motor connections may be again changed so that the generator curve is again traversed from the high current, low voltage condition to the high voltage, low current condition. In this way, the generator characteristic is traversed several times in order to provide the desired tractive effort curve. With the wheel slip relay system described thus far above, the protection is good under high current conditions since a relatively small differential in the speed of the two motors will produce a relatively large differential in field voltage drop to operate the wheel slip relays. However, under low current conditions, a high speed differential between the two motors is necessary in order to provide sufficient voltage drop differential between the two series fields to energize the relays.

In order to recalibrate the relays 8 and 9 to increase their sensitivity at higher speeds, a potential bias is added to the relays 8 and 9 proportional to the locomotive speed. This bias is obtained from the generator output potential by means of a biasing resistor 20 connected between the positive side of the generator, as at 21, and the midpoint between the relay coils 10 and 11, as at 22. Since the generator voltage increases with increase in locomotive speed, and is inversely proportional to the current in the series field 6 and 7, this affords a means for continuously recalibrating the wheel slip relays 8 and 9 in order to compensate for the loss of sensitivity which would otherwise be obtained as the locomotive speed increases. For example, assuming at the high current end of the generator characteristic curve with 50% generator output voltage, the relays 8 and 9 pick up with 40% ampere turns provided from the resistor 20 and 60% from the field voltage drop differential. At the other end of the generator characteristic curve with 100% generator output voltage, the relays will have 80% of their pickup current furnished by the resistor 20 and only require 20% to be furnished by the difference in field drop voltage. It will thus be seen that this arrangement provides greatly increased sensitivity at the high voltage end of the generator characteristic curve so that the wheel slip relays 8 and 9 will operate on a much smaller field drop voltage differential than would otherwise be the case.

The comparison between the wheel slip characteristic using the conventional field drop comparison system and the system described above is shown in Fig. 5. Here, the curves are plotted for two field strengths without transition to different motor connections and without field shunting. These curves show the differential in wheel speed between the slipping axle and the non-slipping axle for various locomotive speeds at which the wheel slippage relays will operate.

While the relays 8 and 9 are shown as having their contacts 14 and 15 connected to illuminate indicating lamp 16 preferably located in the cab of the locomotive, it will be readily understood that these relays may be connected in a control system to directly effect the generator excitation, for example as shown in application Serial No. 139,054 of August V. Johansson filed January 17, 1950, now Patent No. 2,626,362, January 20, 1953, and assigned to the assignee of the present application.

Referring now to Fig. 2 in which like parts are indicated by like reference numerals, there is shown another connection in which the wheel slip relays 8 and 9 are provided with separate potential coils 23 and 24 connected for energization from the biasing resistor 20. It will be readily apparent that this circuit is basically identical with that shown in Fig. 1, however, requiring less current for the bias circuit thus reducing the losses.

It has been found in the field drop comparison method of wheel slip detection described above that any change in motor armature current produces an inductive voltage across the series fields 6 and 7. This inductive voltage is in the correct direction to aid the potential bias in the case of the slipping motor and to oppose the potential bias on the motors which are not slipping. Further, there are continual minor changes in the motor armature current which produce inductive voltages across the motor fields in both directions. In order to prevent false operation due to these minor fluctuations, it has been found desirable to provide the wheel slip relays 8 and 9 with copper sleeves around the core in order to dampen minor fluctuations. This arrangement not only prevents relay response to minor changes, but also provides a hesitating relay pickup.

Referring now to Fig. 3, in which like elements are again indicated by like reference numerals, there is shown a further modification which provides increased sensitivity for the wheel slip relays 8 and 9 responsive to increasing speed. Here, an axle generator 25 shown schematically as being driven by a wheel 26 is connected to a bridge rectifier 27 and the biasing resistor 28 is in turn connected to the output of the bridge rectifier. The axle-driven tachometer-generator 25 is preferably of the permanent magnet field type so that the output voltage across the bridge rectifier 27 is directly proportional to the locomotive speed. This voltage, when rectified, is then used to energize the potential coils 23, 24 of the wheel slip relays 8 and 9. A desirable characteristic of the system is to arrange for a pickup of the wheel slip relays 8 and 9 at a bias voltage at the point where it is desired to provide over speed protection for the locomotive. This is, of course, inherent in this system and may be simply provided by adjusting the gap of the relays. This arrangement thus will provide wheel slip relay recalibration effective throughout the operating speed range of the locomotive and in addition serves as an overspeed relay.

Referring now to Fig. 4, there is shown a wheel slip detection system for a four axle locomotive. The generator 1 is driven by a suitable prime mover 2 and is provided with a separately excited shunt field winding 3. The generator 1 is connected in a loop circuit with traction motors 29 and 30 of one of the trucks and 31 and 32 of the other of the trucks. The traction motors 29 to 32 inclusive are respectively provided with series field windings 33 to 36 inclusive. In this system, in order to provide for progressively changing the motor connections from low speed to high speed, parallel contactors 37 and 38 are respectively provided in series with each pair of motors, as shown, and series contactors 39 are also provided. It will thus be readily apparent that with the contactors 37 and 38 open and the contactors 39 closed, the motors 29 and 30 and 31 and 32 will be respectively arranged in series. In the parallel connection the series contactors 39 are open and the parallel contactors 37 and 38 are closed, which it will be readily seen provides for parallel connection of the traction motors 29 to 32 inclusive. To further provide for decreased field on increased speed, provision is made for shunting the series field windings 33 to 36 inclusive by means of shunting resistors 40 and shunting contactors 41. Field reversers (not shown) may also be provided. Parallel contactors 37 and 38, series contactors 39, and field shunting contactors 41 are connected in any conventional manner to the engineer's controller (not shown) to provide any desired sequence of transition and series field shunting.

In order to provide wheel slip detection, wheel slip relays 42, 43, 44 and 45 are provided, each having a field drop differential coil 46 and a potential bias coil 47. Slip relays of the field drop comparison type are affected by the commercial permissible variations in motor characteristics and these variations are increased somewhat by the variables in shunting resistors and the different lengths of leads used in wiring the locomotive. There is also a difference due to any variation in wheel diameter. When these wheel slip relays are made very sensitive to provide protection at high locomotive speeds, as described above, the pickup current difference or potential may be less than the permissible difference at low speeds. For this reason, it is desirable to connect bridging resistors 48 across each of the series motor fields 33 to 36 inclusive and to connect the relay coils 46 for energization from taps 49. This permits adjustment of the individual taps 49 on bridging resistors 48 to give each of the wheel slip relays 42 through 45 inclusive the same voltage at their maximum sensitivity point, i. e. at high speed.

As shown in Fig. 4, the field drop comparison coils 46 of relays 43 and 44 are connected together by common connection 50 and the field drop comparison coils of the relays 42 and 45 are connected together by a common connection 51. The connections 50 and 51 in turn are connected by connection 52 in which contact 53 is arranged, as will be hereinafter described. The potential bias coils 47 of the wheel slip relays 42 to 45 inclusive are respectively connected for energization from the generator output through biasing resistor 54. It has been found that additional recalibration of the wheel slip relays is desirable for the different motor connections. Accordingly, the biasing resistance 54 is commutated to arrive at the correct calibration for the different modes of operation by means of a contact 55 of relay 56 which shorts out a portion of the resistor 54 and another contact 57 operated by relay 58 which shorts out another portion of the resistor 54. Relay 56 is energized responsive to parallel connection of the traction motors 29 to 32 inclusive and relay 58 is energized responsive to shunting of the series fields 33 to 36 inclusive. It is readily apparent that the relays 56 and 58 may also be connected to the engineman's controller in any suitable manner in order to operate in the proper predetermined sequence. The wheel slip relays 42 to 45 inclusive respectively operates contacts 59 arranged in the circuit of indicating lamps 60. These lamps are arranged for energization from a source of suitable control voltage (not shown) through lines 61 and 62. As pointed out above, instead of providing for connection of the indicating lamps 60, the wheel slip relays 42 to 45 inclusive may be arranged in a suitable wheel slip protection circuit as described in the above referred to application Serial No. 139,054.

For the series connection of the traction motors 29 to 32, it will be readily apparent that the field drop comparison cannot be made between the points 12 and 13 of the motors 29 and 30 and 31 and 32. Therefore, contacts 63 and 64 are provided arranged in the circuits of the field drop comparison coils 46 of the wheel slip relays 42 and 45. The contacts 63 and 64 are operated by relay 65 which is connected by line 66 to the engineman's controller. Thus, when the traction motors 29 to 32 are connected for series operation, the contacts 63 and 64 are opened as is the contact 53 in the interconnection 52 between the lines 50 and 51. Thus, in the series connection, the point 13 of the traction motor 30 and the point 12 of the traction motor 31 are connected by wheel slip relays 43 and 44. In the parallel connection, contacts 63 to 64 will be closed together with contact 53 so as to utilize all of the wheel slip relays 42 to 45 inclusive. It is also desirable to provide time delay in order to delay excitation of the wheel slip relays 42 to 45 inclusive until after transition has occurred in order to permit current stabilization. Accordingly, relay 67 is provided energized from the engineman's controller through line 68 and having a contact 69 in the circuit of coil 70 of time delay relay 71. Time delay relay 71 is in turn provided with contacts 72 arranged in series with relay 65, 73 and 74 arranged in the circuits of the field drop comparison coils 46 of wheel slip relays 43 and 44. Relay 56 is also provided with a contact 75 in series with the relay 65. Thus, when the engineer by moving his controller arrives at a transition point where the motor connections are changed from series to parallel or vice versa, or the series fields are shunted, relay 67 is energized in turn energizing time delay relay 71. This in turn opens contacts 72, 73 and 74. The opening of contact 72 produces deenergization of relay 65 and thus opening of the contacts 63 to 64 in the circuits of the field drop comparison coils 46 of relays 42 and 45 and the opening of the contacts 73 and 74 likewise opens the circuits of the field comparison coils 46 of the wheel slip relays 43 and 44.

It will now be readily seen that the improved wheel slip detection system of this invention provides greatly increased sensitivity of the wheel slip relays at high speeds by providing for recalibration of the wheel slip relays responsive to the speed of the locomotive. This may be continuously accomplished by utilizing a biasing voltage secured either from the generator output voltage or a separate axle generator. The axle generator form of biasing voltage also permits definite pickup on locomotive overspeed. Furthermore, means are provided for modifying the wheel slip relay recalibration in accordance with the various modes of motor operation.

While I have shown and described particular embodiments of this invention, further modifications and improvements will occur to those skilled in the art. I desire it to be understood, therefore, that this invention is not limited to the embodiments shown and I intend in the appended claims to cover all modifications which do not depart from the spirit and scope of this invention.

What we claim as new and desire to secure by Letters Patent of the United States is:

1. In a wheel slip detection system for a vehicle having a plurality of traction motors, wheel slip indicating means including a relay having a coil connected across normally equi-potential points in the circuits of two of said motors, and means arranged to derive a signal proportional to the speed of said vehicle connected to bias said relay responsive to said signal for recalibrating said relay coil.

2. In a wheel slip detection system for a vehicle having a traction generator and a plurality of traction motors energized thereby, wheel slip indicating means including a relay coil connected across normally equi-potential points in the circuits of two of said motors, and means responsive to the output of said generator for recalibrating said relay coil.

3. In a wheel slip detection system for a vehicle having a traction generator and a plurality of traction motors energized thereby, wheel slip indicating means including a relay coil connected across normally equipotential points in the circuits of two of said motors, and means for supplying a bias on said relay coil responsive to the output of said generator for recalibrating said relay coil.

4. In a wheel slip detection system for a vehicle having a traction generator and a plurality of traction motors, wheel slip indicating means including a relay coil connected across normally equi-potential points in the circuits of two of said motors, and means including a resistor connected in circuit with said generator and said relay coil for supplying a voltage bias to said coil responsive to the voltage output of said generator for recalibrating said relay coil.

5. In a wheel slip detection system for a vehicle having a plurality of traction motors, wheel slip indicating means including a pair of relays having serially connected relay coils connected across normally equi-potential points in the circuits of two of said motors, and means arranged to derive a signal proportional to the speed of said vehicle connected to bias said relays responsive to said signal for recalibrating said relay coils.

6. In a wheel slip detection system for a vehicle having a plurality of traction motors each having a series field exciting winding, wheel slip indicating means including a pair of serially connected relay coils connected across the midpoints between each of said motors and its associated series field, and means for supplying a bias to said coils responsive to the speed of said vehicle for recalibrating said coils.

7. In a wheel slip detection system for a vehicle having a plurality of traction motors, wheel slip indicating means including a relay having a coil connected across normally equi-potential points in the circuits of two of said motors, and another coil on said relay connected for energization responsive to the speed of said vehicle for recalibrating said relay.

8. In a wheel slip detection system for a vehicle having a traction generator and a plurality of traction motors energized thereby, wheel slip indicating means including a relay having a coil connected across normally equi-potential points in the circuits of two of said motors, said relay having another coil connected for energization responsive to the output of said generator for recalibrating said relay.

9. In a wheel slip detection system for a vehicle having a traction generator and a plurality of traction motors energized thereby, wheel slip indicating means including a relay having a first coil connected across normally equi-potential points in the circuits of two of said motors and a second coil, and resistance means connected in circuit between said generator and said second coil for supplying a voltage bias to said relay responsive to the output voltage of said generator for recalibrating said relay.

10. In a wheel slip detection system for a vehicle having a plurality of traction motors, wheel slip indicating means including a relay having a first coil connected across normally equi-potential points in the circuits of two of said motors and a second coil, and an axle generator connected to energize said second coil for supplying a voltage bias to said relay responsive to the speed of said vehicle for recalibrating said relay.

11. In a wheel slip detection system for a vehicle having a plurality of traction motors, wheel slip indicating means including a pair of relays each having a first coil, said first coils being serially connected across normally equi-potential points in the circuits of two of said motors, each of said relays having a second coil, said second coils being connected in parallel, and means for supplying a voltage to said second coils responsive to the speed of said vehicle for biasing said relay for recalibration.

12. In a wheel slip detection system for a vehicle having a traction generator and a plurality of traction motors each having a series field exciting winding, wheel slip indicating means including a pair of relays each having a first coil, said first coils being serially connected across the midpoints between each of said motors and its associated series field, said relays having second coils connected in parallel, and resistance means connected between said generator and said second coils for supplying a voltage bias on said second coils responsive to the output voltage of said generator for recalibrating said relays.

13. In a wheel slip detection system for a vehicle having a traction generator and a plurality of traction motors energized thereby, wheel slip indicating means including a relay coil connected across normally equi-potential points in the circuits of said motors, means for selectively altering the connections of said motors, resistance means connected in circuit between said generator and said relay coil for supplying a voltage bias to said coil responsive to the output of said generator for recalibrating said relay, and means responsive to said altering means for modifying said resistance means.

14. In a wheel slip detection system for a vehicle having a traction generator and a plurality of traction motors each having a series field exciting winding, wheel slip indicating means including a pair of relays each having first and second coils, said first coils being serially connected across the midpoints between each of said motors and its associated series field, said second coils being connected in parallel, and resistance means connected between said generator and said second coils for supplying a voltage bias to said relay responsive to the output voltage of said generator for recalibrating said relay.

References Cited in the file of this patent

UNITED STATES PATENTS

| | | |
|---|---|---|
| 2,328,994 | Ogden | Sept. 7, 1943 |
| 2,372,145 | Weybrew | Mar. 10, 1945 |
| 2,403,933 | Lillquist | July 16, 1946 |
| 2,436,341 | Weybrew | Feb. 17, 1948 |
| 2,523,169 | Weybrew | Sept. 19, 1950 |
| 2,626,362 | Johansson | Jan. 20, 1953 |